United States Patent
Brand et al.

(10) Patent No.: US 12,007,952 B2
(45) Date of Patent: Jun. 11, 2024

(54) SYSTEM AND METHOD FOR DIRECT OBJECT TO FILE MAPPING IN A GLOBAL FILESYSTEM

(71) Applicant: CTERA Networks Ltd., Petah Tikvah (IL)

(72) Inventors: Aron Brand, Hod Hasharon (IL); Amir Goldstein, Tel-Aviv (IL)

(73) Assignee: CTERA Networks Ltd., Petah Tikvah (IL)

( * ) Notice: Subject to any disclaimer, the term of this patent is extended or adjusted under 35 U.S.C. 154(b) by 0 days.

(21) Appl. No.: 17/644,196

(22) Filed: Dec. 14, 2021

(65) Prior Publication Data

US 2023/0185774 A1    Jun. 15, 2023

(51) Int. Cl.
*G06F 16/18* (2019.01)
*G06F 16/13* (2019.01)
*G06F 16/182* (2019.01)

(52) U.S. Cl.
CPC .......... *G06F 16/183* (2019.01); *G06F 16/134* (2019.01)

(58) Field of Classification Search
CPC .............................. G06F 16/183; G06F 16/134
USPC ......................................................... 707/827
See application file for complete search history.

(56) References Cited

U.S. PATENT DOCUMENTS

| 10,574,753 B2 | 2/2020 | Brand | |
| 10,917,260 B1* | 2/2021 | Bashyam | .............. G06F 16/183 |
| 2015/0261801 A1* | 9/2015 | Barton | ................ H04L 67/5651 |
| | | | 707/697 |
| 2017/0195417 A1 | 7/2017 | Brand | |
| 2020/0145499 A1* | 5/2020 | Kaplan | ............. G06F 16/24573 |
| 2020/0314165 A1 | 10/2020 | Brand et al. | |

OTHER PUBLICATIONS

International Search Report for PCT/IB2022/062241, dated Mar. 20, 2023. International Bureau of WIPO.
Written Opinion of the International Searching Authority for PCT/IB2022/062241, dated Mar. 20, 2023. International Bureau of WIPO.
Github. "s3fs-fuse: FUSE-based file system backed by Amazon S3" August. https://github.com/s3fs-fuse/s3fs-fuse.

* cited by examiner

*Primary Examiner* — Hosain T Alam
*Assistant Examiner* — Tracy M McGhee
(74) *Attorney, Agent, or Firm* — M&B IP Analysts, LLC

(57) ABSTRACT

A method for storing a file in cloud storage service (CSS) having a blocks index indexing blocks each having a unique block identifier, the entries thereof indicating for each block identifier a location of the block within an object storage system (OSS), the method comprising: the CSS transmitting a list of block identifiers indicating respective blocks that are not in the blocks index but which are indicated by a received file map for the file; adding an entry into the blocks index to indicate a location of uploaded blocks within the OSS for each block of the list and that has been successfully uploaded to the OSS; and when all of the blocks have been successfully uploaded, concatenating all blocks of the received file map in an order specified by the received file map to form a file object corresponding to the file in the OSS.

18 Claims, 7 Drawing Sheets

SYSTEM AND METHOD FOR DIRECT OBJECT TO FILE MAPPING IN A GLOBAL FILESYSTEM

TECHNICAL FIELD

The present disclosure relates generally to cloud storage and more specifically to storage of files in an object storage system.

BACKGROUND

Object storage systems are computer data storage systems that manage data as objects, each object typically including the data itself, some metadata attributes and globally unique identifier. The demand for object storage has been rapidly increasing. As the amount of data (such as digital media) stored by users grows, so does the need to store digital media reliably over extended periods of time. Object storage offers superior scalability for storing numerous objects compared to traditional file-based storage systems. Furthermore, commercially available object storage systems such as Amazon Web Services (AWS®), Simple Storage Service (S3), IBM® Cloud Object Storage, Azure® Blob Storage, all offer superb ability for handling numerous concurrent clients reading and writing data over high latency WAN links. Object storage systems excel in the retention of massive amounts of unstructured data at a low cost per gigabyte. Where object storage systems fall short, however, is in the retention of data that is organized in a hierarchical fashion in a nested directory structure. Object storage systems further lacks features that are typically supported by filesystems, such as the partial modification of stored objects and storage quota management.

Existing systems allow creating a filesystems abstraction on an object storage system, for example by using a filesystem utilized as a cache in front of an object storage system. Some of such systems rely on a blocks layout, namely, breaking the files into a plurality of unique blocks and storing them individually in an object storage system. Such systems provide the benefits of data deduplication and transfer acceleration. One such system for storing the data of a global filesystem in a blocks layout is described in U.S. Pat. No. 10,574,753. Blocks layouts are efficient and reduce the amount of required storage space and network traffic, since the file is broken into blocks utilizing deduplication and compression. They also support an unlimited file size, regardless of the maximum supported object size. However, an existing application wishing to employ the data directly cannot make sense of the underlying object storage bucket without modification of the application which must be specially coded to reassemble files from the blocks layout of such a system. Therefore, there is an incentive to offer a files layout, namely, a layout having a direct, one-to-one mapping from files to objects, in which each file is stored as an individual object that can be natively accessed, e.g., conventionally as files, at least for reading by the clients of the object storage, using standard application programming interfaces (API) such as Amazon S3 or Azure Blob Storage API. Note that by natively accessed it is that the file may be read from object storage using a single get operation. In contrast, when using a blocks layout, it is necessary for the client to have a special understanding of the way files are formatted in the object storage, and reading them requires sending multiple requests to the object storage and stitching together the responses of the object storage in order to reconstruct the original contents of the file Some commonly available software, such as s3fs, allow accessing object storage using a filesystem interface with a files layout. However such systems typically do not fully support standard filesystem semantics and do not have performance comparable to a local filesystem. For example, appending one byte to a file would typically require uploading the whole file again to the object storage. Similarly, if a file upload is interrupted for any reason the entire file would need to be uploaded again.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a method for storing a file in cloud storage service (CSS) having a blocks index for indexing blocks that each have a unique block identifier, each block identifier being based on the content of the respective one of the blocks that it identifies, the blocks index having entries indicating for each block identifier at least one location of the block within an object storage system (OSS). The method comprises: transmitting, from the CSS, a list of at least one block identifier indicating at least one respective block that is not in the blocks index but which is indicated by a received file map for the file, each block on the list having a unique block identifier; adding, by the CSS, for each respective block indicated on the list and that has been successfully uploaded to the OSS, an entry into the blocks index to indicate a location of the uploaded block within the OSS; and when all of the blocks indicated on the list have been successfully uploaded, concatenating all of the blocks of the received file map in an order specified by the received file map to form a file object corresponding to the file in the OSS.

Certain embodiments disclosed herein include a non-transitory computer readable medium having stored thereon instructions for causing a processing circuitry to execute a process for storing a file in a cloud storage service (CSS) having a blocks index for indexing blocks that each have a unique block identifier, each block identifier being based on the content of the respective one of the blocks that it identifies, the blocks index having entries indicating for each block identifier at least one location of the block within an object storage system (OSS). The process comprises: transmitting, from the CSS, a list of at least one block identifier indicating at least one respective block that is not in the blocks index but which is indicated by a received file map for the file, each block on the list having a unique block identifier; adding, by the CSS, for each respective block indicated on the list and that has been successfully uploaded to the OSS, an entry into the blocks index to indicate a location of the uploaded block within the OSS; and when all of the blocks indicated on the list have been successfully uploaded, concatenating all of the blocks of the received file map in an order specified by the received file map to form a file object corresponding to the file in the OSS.

Certain embodiments disclosed herein include a system for storing a file in cloud storage service (CSS) having a blocks index for indexing blocks that each have a unique block identifier, each block identifier being based on the content of the respective one of the blocks that it identifies, the blocks index having entries indicating for each block identifier at least one location of the block within an object storage system (OSS). The system comprises: a processing circuitry; and a memory, the memory containing instructions that, when executed by the processing circuitry, configure the system to: transmit, from the CSS, a list of at least one block identifier indicating at least one respective block that is not in the blocks index but which is indicated by a received file map for the file, each block on the list having a unique block identifier; add, by the CSS, for each respective block indicated on the list and that has been successfully uploaded to the OSS, an entry into the blocks index to indicate a location of the uploaded block within the OSS; and when all of the blocks indicated on the list have been successfully uploaded, concatenate all of the blocks of the received file map in an order specified by the received file map to form a file object corresponding to the file in the OSS.

DETAILED DESCRIPTION

In the description, identically numbered components within different ones of the FIGS. refer to components that are substantially the same.

The present disclosure provides a global filesystem that provides a files layout for accessing files natively as objects while at the same time providing a native filesystem interface for accessing files by client devices. By this it is meant that files can be accessed from the object storage using object storage semantics since each file is represented by a single object, e.g., a file object, in the files layout. A file can also be accessed natively using standard filesystem semantics on a client device using a virtual filesystem driver that provides such access. One advantage of the invention is that can provided full compatibility with existing file-based workloads. Another benefit of the present invention is that the resulting filesystem interface may be a global filesystem that can be accessed concurrently by a plurality of clients in disparate geographic locations.

Figure 1:
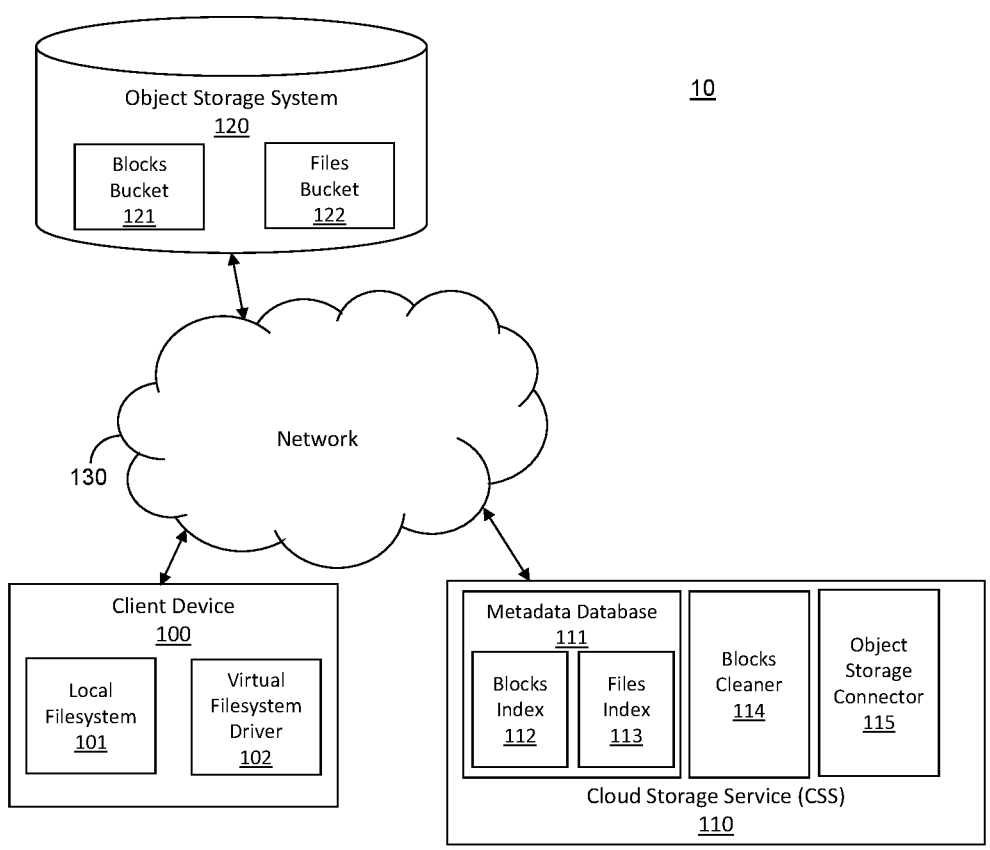
FIG. 1 shows an illustrative infrastructure arrangement according to an embodiment.

FIG. 1 shows illustrative infrastructure arrangement 10 including one or more client devices 100, cloud storage service (CSS) 110 and object storage system 120 connected by a network 130 according to an embodiment.

Figure 2:
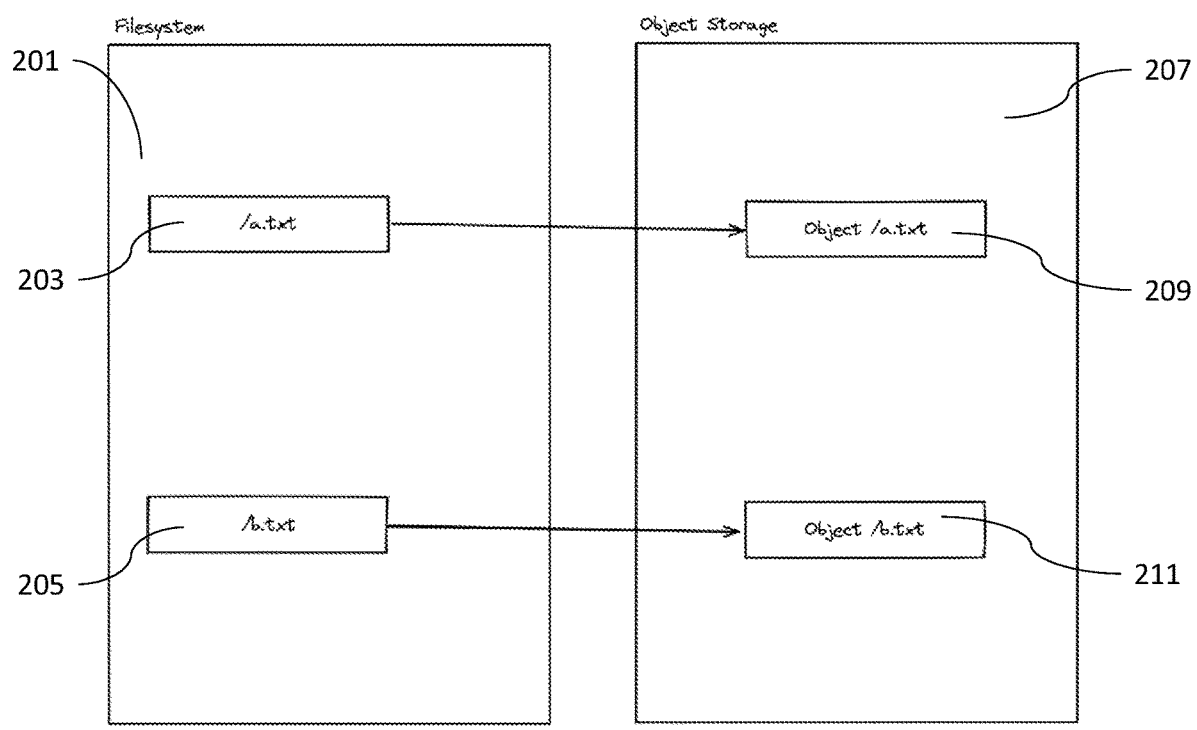
FIG. 2 shows an illustrative prior art files layout of a file system and an illustrative prior art object arrangement of the same files of that file layout as they may be stored as objects in a prior art cloud storage system.

FIG. 2 shows an illustrative prior art files layout 201 of a file system including two illustrative files a.txt 203 and b.txt 205, e.g., as the files may be arranged at user device or a server 201, and an illustrative prior art object arrangement 207 of the same files of that file layout as they may be stored as file objects 209 and 211 in a prior art cloud storage system. In files layout 201 the files are stored in the usual manner as a file. Similarly, file objects 209 and 211 corresponding to files a.txt 203 and b.txt 205 are stored in the usual manner as conventional files.

Figure 3:
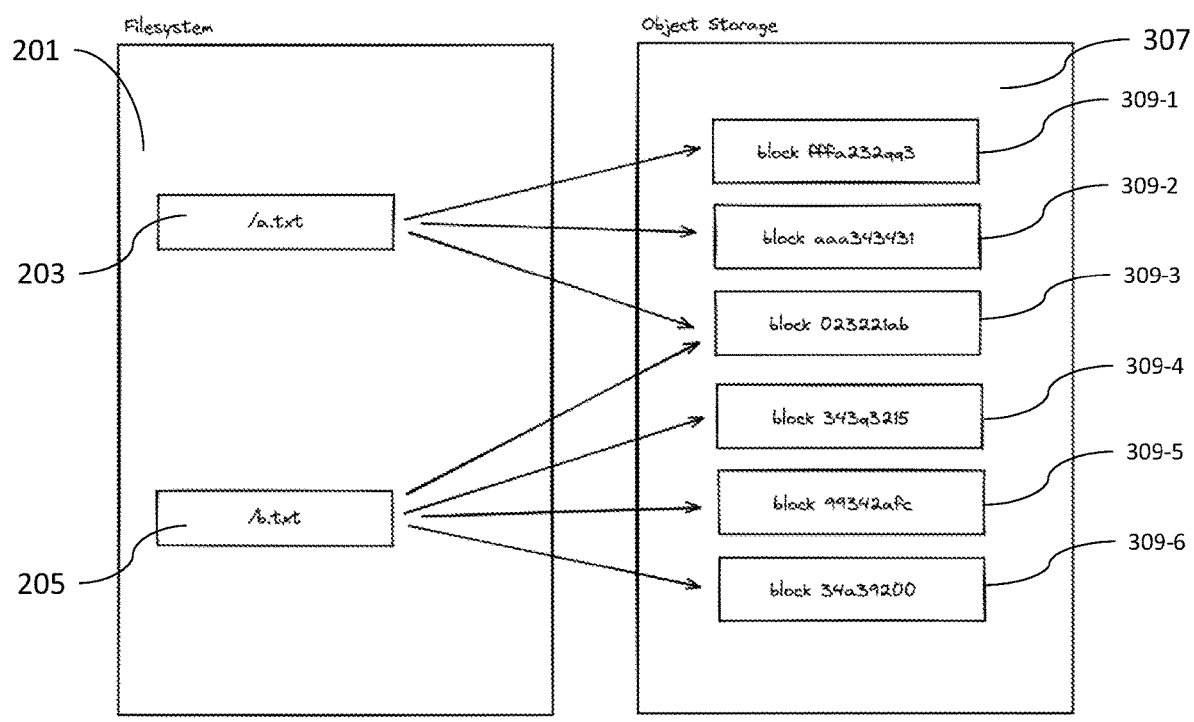
FIG. 3 shows the same illustrative prior art files layout of the file system shown in FIG. 2, e.g., as the files may be arranged at user device or a server, and an illustrative prior art object arrangement of the same files of that file layout as they may be stored using block objects in a prior art cloud storage system.

FIG. 3 shows the illustrative prior art files layout 201 of a file system including two illustrative files a.txt 203 and b.txt 205, e.g., as the files may be arranged at user device or a server 201, as shown in FIG. 2, and an illustrative prior art object arrangement 307 of the same files of that file layout as they may be stored using block objects, which are objects representing a block, in a prior art cloud storage system. In files layout 201 the files are stored in the usual manner as a file. However, in object arrangement 307 each file is stored as a set of block objects 309 each of which contains some of the data, i.e., a block, that makes up the file. For example, file a.txt 203 is represented in object storage 307 as block objects 309-1, 309-2, and 309-3 each of which contains one indicated block. Similarly, file a.txt 203 is represented in object storage 307 as block objects 309-3, 309-4, 309-5, and 309-6 each of which contains one indicated block.

Note that the block objects that that contain the blocks that make up each file are identified and shown only for purpose of discussion and they need not be stored or arranged in object storage 307 in any order. Furthermore, the block objects need not be stored in a way that indicates which one or more files they belong to. Rather, the particular block objects that make up a file may be indicated in a list which is referred to herein as a "file map". Such a file map may be kept in one embodiment in metadata database 111 of cloud storage service 110. In another embodiment, such a file map may be kept in separate "file map" objects (not shown) in object storage system 120.

Similarly, returning to FIG. 1, each file of infrastructure arrangement 10 may be considered as consisting of a plurality of blocks, with each block representing a non-overlapping byte range within the file. Object storage system 120 contains a) blocks bucket 121 which is used for storing block objects, which, as indicated above, are objects representing a block, and b) files bucket 122 for storing file objects, which are objects representing entire files in a files layout. It should be appreciated that, as hinted above, a block may be referenced by a plurality of files. It should further be appreciated that although only one object storage system is shown in FIG. 1 that there may be on other embodiments more than one object storage system and furthermore, each object storage system may be made up of more than one object storage system.

Network 130 may be, but is not limited to, a wireless, cellular or wired network, a local area network (LAN), a wide area network (WAN), a metro area network (MAN), the Internet, the worldwide web (WWW), similar networks, and any combination thereof.

Client device 100 may be a user's personal device such as, but not limited to, a personal computer, a laptop, a tablet computer, a smartphone, a wearable computing device, and the like. In other embodiments, client device 100 may be a storage appliance, such as a storage gateway, a cache storage appliance, and the like, which allow other computing device to access the global filesystem over the network using protocols such as SMB or NFS. In one implementation, client device 100 may include a software agent configured to perform at least some of the processes disclosed herein. Software shall be construed broadly to mean any type of instructions, whether referred to as software, firmware, middleware, microcode, hardware description language, or otherwise. Instructions may include code, e.g., in source code format, binary code format, executable code format, or any other suitable format of code.

Client device 100 includes 1) local filesystem 101 which may be used as a local cache for the object storage system and 2) virtual filesystem driver 102 which is used for providing transparent access to the global filesystem by users and applications of client device 100.

The local filesystem is a filesystem such as XFS, ExFAT or NTFS which provides for storing of files locally on persistent storage volumes of the client device. The local filesystem is typically implemented by the operating system of the client device such as Unix or Windows.

Virtual filesystem driver 102 is a software component which implements an abstraction of a filesystem to applications. Typically, virtual filesystem driver 102 is implemented an operating system extension such as a kernel module, or a userspace module such as filesystem in user space (FUSE). In one embodiment, virtual filesystem driver 102 intercepts system calls for filesystem operations such as creating a file, writing to a file, reading from a file, listing files, and provides an implementation for those operations, for example by relaying some operations to a cloud service while relaying other operations to the local filesystem.

CSS 110 includes 1) metadata database 111, which includes (i) blocks index 112 and (ii) files index 113; 2) blocks cleaner unit 114; and 3) object storage connector unit 115 providing connectivity to the object storage system 120. Blocks index 112 stores the list of blocks in the system, the list being keyed by the block identifier. Files index 113 stores the list of files in the global filesystem. Blocks cleaner unit 114 is responsible for finding and deleting block objects which are no longer needed, thereby reclaiming otherwise wasted space. Object storage connector unit 115 provides an interface for the CSS to retrieve or store blocks in an associated storage system such as one or more object storage systems 120, or any other forms of storage capable of storing data objects.

In an embodiment, client device 100 provides global filesystem access to local users logged on client device 100 or to applications running locally on client device 100. In another embodiment, client device 100 provides access for other devices to the global filesystem over a network, for example by implementing the SMB or NFS protocols.

In an embodiment, object storage system 120 is external to and distinct from cloud storage service 110, for example being provided as a remote service by a cloud storage provider such as Amazon S3 or Azure Blob Storage. In another embodiment, object storage system 120 and cloud storage system 110 may be combined together as part of a single entity.

In an embodiment, metadata database 111 is a commercially available database such as MySQL or Cassandra. In another embodiment, metadata database 111 is an in-memory database.

In an embodiment, instead of having separate blocks bucket 121 and files bucket 122, there is instead a single object storage bucket. In such a single object storage bucket objects stored therein are distinguished by having different prefixes in the unique identifier for the object. For example, blocks may have identifiers that begin with a reserved prefix such as "/.blocks/" and files may have identifiers with no prefix.

In an embodiment, one or more of blocks bucket 121 and files bucket 122 may be implemented using forms of storage capable of storing data objects, either persistently or non-persistently, including without limitation as a file server, a memory-based key/value store, and so on. Thus, while this disclosure is typically described as being implemented with "object storage" as the backend, where the common definition of object storage is often narrowly construed, nevertheless, one of ordinary skill in the art will realize that in practice many types of storage systems are capable of storing data objects. Therefore, where object storage is mentioned herein it may be interpreted as covering any type of storage that is capable of storing data objects, even if such type of storage is not a classical "object storage", unless otherwise specifically limited.

Some object storage systems may be inefficient for storing smaller objects, for example, objects that are 100 kilobytes or smaller in size. Therefore, rather than using an object to represent a single block, it may be beneficial to pack together a plurality of smaller blocks into a larger container object stored in the blocks bucket. In such embodiments, the blocks index may also maintain for each indexed block ID a pointer to the container object containing the block and a byte range indicating the offset and length of the block within the container object. In such embodiments, the upload token may be a container upload token which provides the device with instructions to upload a concatenation of a plurality of specified missing blocks as a single container object to the blocks bucket.

One of ordinary skill in the art will readily be able to adapt the disclosed concepts to cover multiple blocks per object rather than a single block per object. Therefore, all of the disclosure that refers to block objects may be interpreted as referring to either block objects containing a single block or container objects containing multiple blocks.

Figure 4:
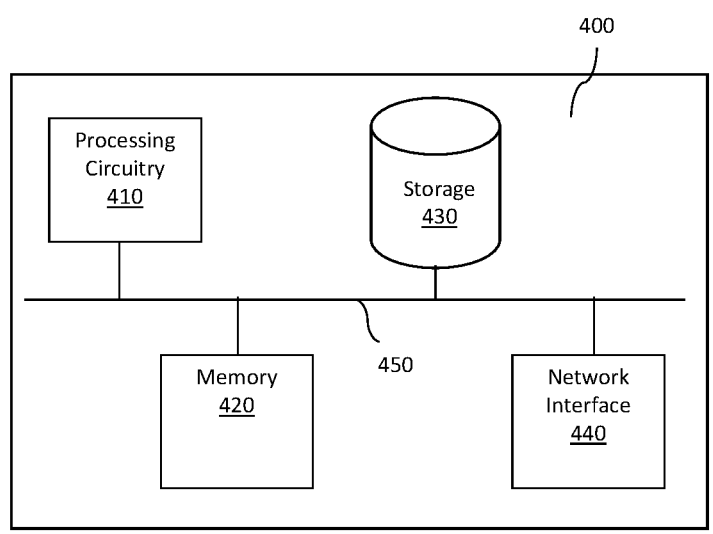
FIG. 4 is an schematic diagram of an illustrious arrangement implementing a cloud storage service according to an embodiment.

FIG. 4 is a schematic diagram of an illustrious arrangement 400 implementing CSS 130 according to an embodiment. Arrangement 400 includes a processing circuitry 410 coupled to memory 420, storage 430, and network interface 440. In an embodiment, the components of arrangement 400 may be communicatively connected via bus 450.

Processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

Memory 420 may be volatile, e.g., RAM, etc., non-volatile, e.g., ROM, flash memory, etc., or a combination thereof. In one configuration, computer readable instructions to implement one or more embodiments disclosed herein may be stored in storage 430.

In another embodiment, memory 420 is configured to store software. Software shall be construed broadly to mean any type of instructions, whether referred to as software, firmware, middleware, microcode, hardware description language, or otherwise. Instructions may include code, e.g., in source code format, binary code format, executable code format, or any other suitable format of code. The instructions, when executed by processing circuitry 410, cause processing circuitry 410 to perform the various processes described herein. Specifically, the instructions, when executed, cause processing circuitry 410 to create, generate, and manage direct to cloud file transfers as described hereinbelow using cloud file descriptors.

Storage 430 may be magnetic storage, optical storage, and the like, and may be realized, for example, as flash memory or other memory technology, CD-ROM, Digital Versatile Disks (DVDs), or any other medium which can be used to store the desired information.

Network interface 440 allows CSS 130, when implemented by arrangement 400, to communicate with client device 120 and object storage system 140 for the purpose of, for example, receiving data, sending data and files, and the like.

It should be understood that the embodiments described herein are not limited to the specific architecture illustrated in FIG. 4, and other architectures may be equally used without departing from the scope of the disclosed embodiments.

The same basic structure as shown in FIG. 4 may be used as well to implement client device 100 and object storage system 120.

Figure 5:
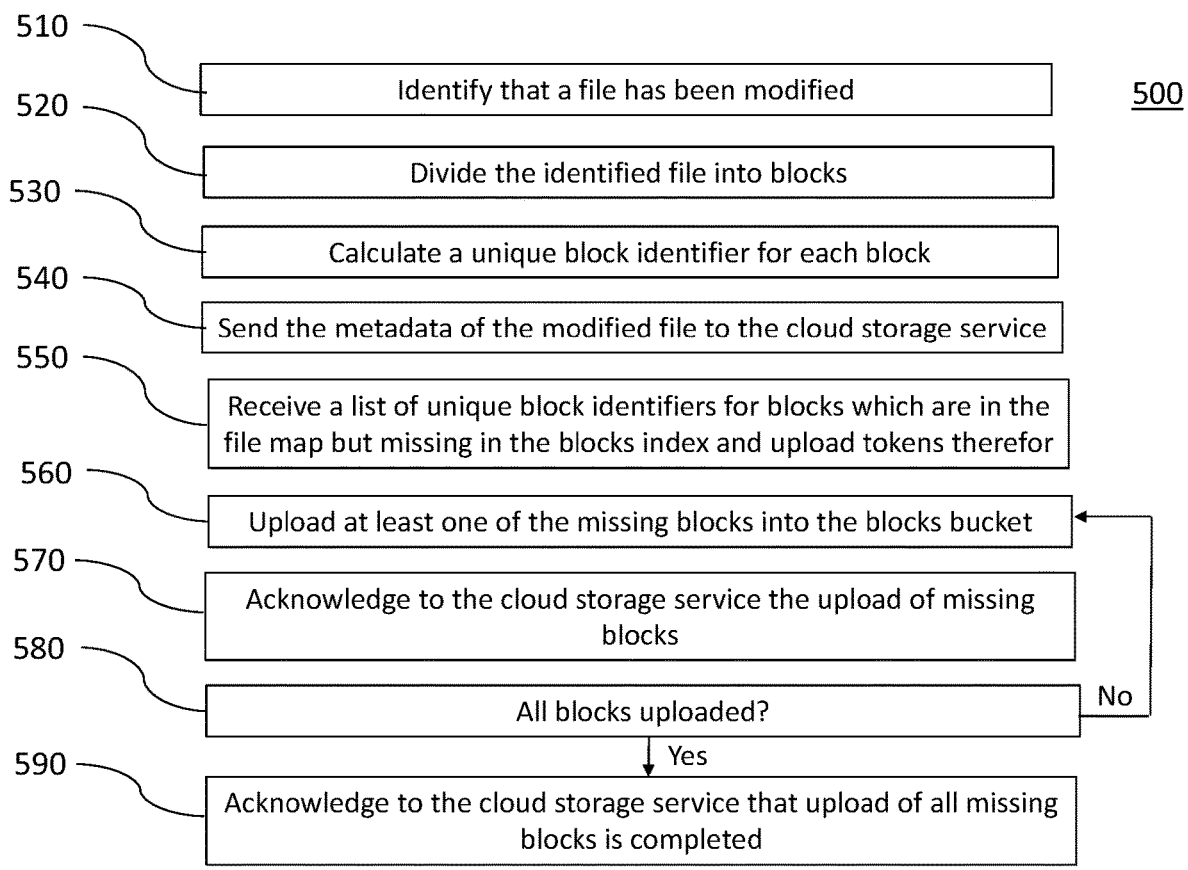
FIG. 5 shows an illustrative flowchart of a process of uploading a modified file from a client device to an object storage system with orchestration by a cloud storage service as seen from the perspective of the client device.

FIG. 5 shows an illustrative flowchart 500 of the process of uploading a modified file from client device 100 to object storage system 120 with orchestration by the CSS 110 as seen from the perspective of client device 100.

The process is entered in step 510 when client device 100 identifies that a file has been modified. Next, in step 520, client device 100 divides the identified file into blocks. Thereafter, in 530, client device 100 calculates a unique block identifier for each block using, for example, a hash function, and from the list of hashes, constructs a file map. In step 540, client device 100 sends the metadata of the modified file to the cloud storage service 110, the metadata including at least the file map. The constructed file map includes at least an ordered sequence indicating the blocks that make up the file, where the blocks may be indicated by their unique block identifier. The metadata of the file may include also the file name and path or another unique identifier of the file, as well as at least one of the file attributes.

Then, in step 550, client device 100 receives from the cloud storage service 110 a list of unique block identifiers which are in the file map but missing in the blocks index 112, along with an upload token for each missing block, each respective upload token indicating at least one instruction for uploading the block to the blocks bucket 121. By "instruction" it is meant that the token includes all the necessary information for the client to successfully upload the block to the blocks bucket. This may include details such as the URL to store the object, the needed credentials, which may be temporary or permanent, the type of storage protocol to use, and so on. In step 560, client device 100 next uploads the at least one of missing blocks into blocks bucket 121, the uploading being based on the upload token. An acknowledgement of the blocks that were uploaded in step 560 is sent from client device 100 to the cloud storage service 110 in step 570.

Next, conditional branch point 580 tests to determine if all of the missing blocks have been uploaded. If the test result in step 580 is NO, indicating that there yet remain more blocks on the list to be uploaded, control passes back to step 560 so that additional blocks may be uploaded. If the test result in step 580 is YES, indicating that all of the blocks on the list have been uploaded, control passes to step 580 in which client device 100 acknowledges to cloud storage service 110 that client device 100 has completed the uploading of all of blocks indicated in the missing blocks list received in step 550.

In an embodiment, the upload token of step 550 consists of a temporary credential which authorizes the client device to store the object in a specific location, such as a signed URL described in detail in the co-pending U.S. patent application Ser. No. 16/368,011 filed on Mar. 28, 2019 and entitled "Cloud File Transfers Using Cloud File Descriptors" which was published as United States Patent Publication US20200314165A1 and which is incorporated by reference as if entirely set forth herein.

In another embodiment, the missing blocks may be uploaded via a secure communication channel to cloud storage service 110 which then in turn stores the objects in object storage system 120. In other words, in this embodiment, the blocks are sent to cloud storage service 110 over a secure communication channel, and CSS 110 then stores the objects to object storage system 120 instead of having the clients directly upload blocks to the object storage. Note that in such embodiments, the acknowledgements mentioned above as being sent from device 100 are not needed, rather the cloud storage system directly knows of the completion of the upload.

It should be appreciated that the use of upload acknowledgement notifications from client device 100, e.g., as described hereinabove with regard to step 560, is not required. Instead, in other embodiments, it is possible for cloud storage service 110 to learn of the completion of the uploads from object storage system 120 itself, which is able to check for existing specific objects and typically also has an ability to provide out-of-band notifications upon the uploading of new objects. In one such embodiment, rather than relying on acknowledgements from client device 100 cloud storage service 110 may check for the existence of the uploaded blocks in object storage system 120 and then update metadata database 111 as to blocks that were found to have already been uploaded. In another such embodiment, cloud storage service 110 may receive object upload notifications from object storage system 120 and then update metadata database 111 for blocks that were reported to have been uploaded.

In another embodiment, files, e.g., large files, may be broken into multiple byte ranges, such that the file upload process is performed separately for each byte range. In an embodiment, each said byte range is represented by a corresponding file map. Typically, a file of hundreds of megabytes or more would be considered a large file. Breaking down large files to multiple file maps and performing the uploads in multiple byte ranges is beneficial as it ensures an upper limit to the size of the file maps, which typically are held in RAM. This also allows multiple file maps to be generated and processed in parallel while uploading a large file.

It should be noted that steps in the above flowchart is shown as executed sequentially for sake of simplicity. However, one or more of the steps or portions thereof may be executed concurrently with one or more others of the steps or portions thereof to provide higher efficiency and improved performance in view of network and storage latencies. Furthermore, as will be appreciated by those of ordinary skill in the art, the order of execution of the steps in the above process may vary from the specifics shown above.

Figure 6:
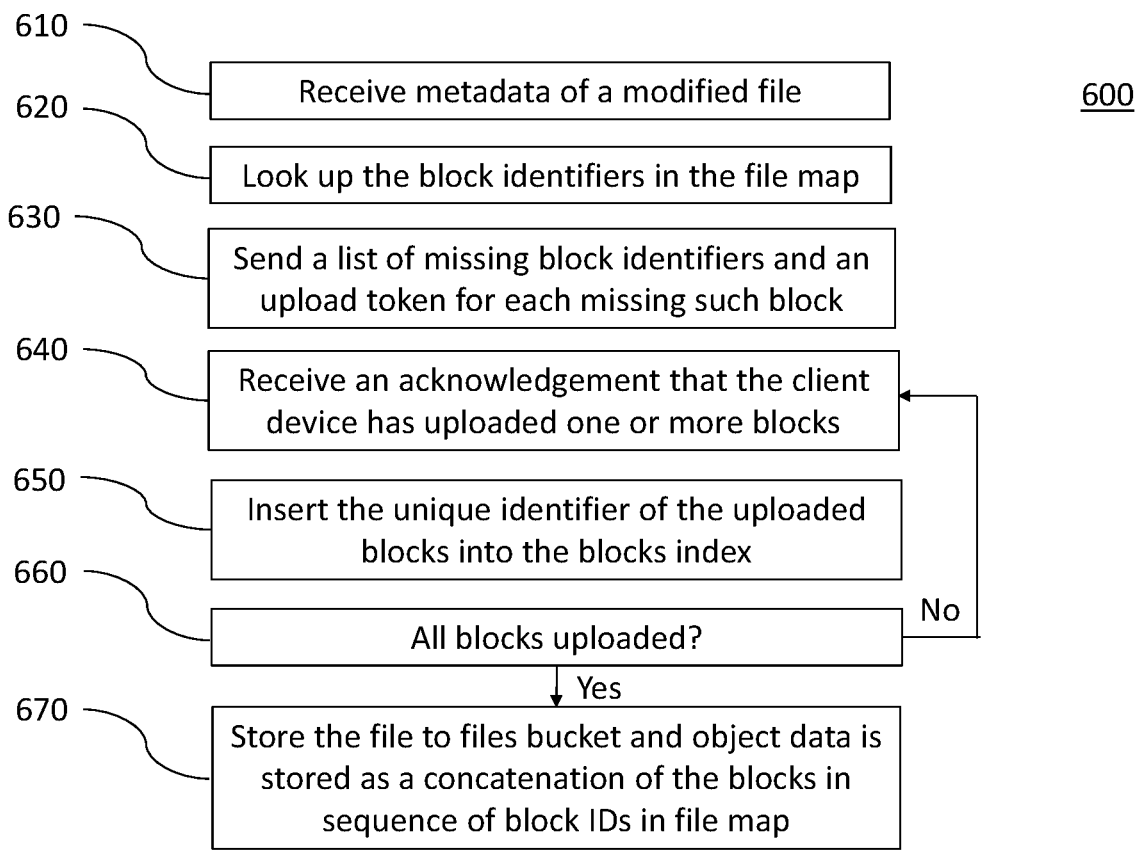
FIG. 6 shows an illustrative flowchart of a process of uploading a modified file from a client device to an object storage system with orchestration by a cloud storage service as seen from the perspective of the cloud storage service.

FIG. 6 shows an illustrative flowchart 600 of the process of uploading a modified file from client device 100 to object storage system 120 with orchestration by the CSS 110 as seen from the perspective of CSS 110.

The process is entered in step 610 in which cloud storage service 110 receives the metadata of a modified file from client device 100, the metadata including a file map, a file name, a file path, and file attributes. As noted above, the file map includes block identifiers for blocks that make up the file, e.g., in sequence. However, as here only a portion of the file may have been modified it may be possible in some embodiments to employ a partial file map that only specifies blocks that contain the modified portion of the file. Next, in step 620, cloud storage service 110 looks up in the blocks index 112 each of the block identifiers listed the file map to determine a list of unique block identifiers that were listed in the file map but are not stored in the blocks index 112. Thereafter, in step 630, cloud storage service 110 sends to client device 100 a list of unique block identifiers which were determined to have been listed in the file map but were not found to exist in blocks index 112. Also, if the list is not empty, for each such missing block an upload token indicating instruction for uploading the block to blocks bucket 121.

Cloud storage service 110 receives an acknowledgement that client device 100 has uploaded one or more of the blocks in step 640. This acknowledgment may, in one embodiment, come from client device 100 itself. In other embodiments it may be generated using other methods such as are described hereinabove with regards to FIG. 5.

In step 650, cloud storage service 110 inserts the unique identifier of the uploaded blocks into blocks index 112 within the metadata database 111 of CSS 110.

Next, conditional branch point 660 tests to determine if all the blocks specified by the list of missing block identifiers have been uploaded. If the test result in step 660 is NO, indicating that there yet remains at least one more block specified on the list of missing block identifiers to upload, control passes back to step 640. If the test result in step 660 is Yes, indicating that there remain no more blocks to upload, control passes to step 670.

During step 670, cloud storage service 110 stores the file to files bucket 122 of object storage system 120 as an object with a unique identifier based on the file name and path with the object's data being stored as a concatenation of the blocks from blocks bucket 121 of object storage system 120 corresponding to the sequence of block identifiers (IDs) in the file map.

In more detail, as noted above, a file map defines the list of blocks that are needed to reconstruct a file and it includes a specification of the sequence of the blocks for doing so. Each of the blocks can be found and read based on their ID. If the blocks are read and then assembled per the order specified in the file map, i.e., concatenating the blocks in the specified order, the result is an object with the data of the original file. This results in the file being represented in a file representation, since the result is an object containing the file, i.e. the original data, and the object id is the path and name as called for in the file layout. In other words, objects in the files layout and files have a one to one mapping in that each file is represented by one object that contains the data of the file.

It should be appreciated that the above process accelerates the upload of files that have been modified when at least some of the blocks of the modified file already exist in the blocks bucket 121.

Advantageously, this process provides for efficient resuming of interrupted file uploads. This is because cloud storage service 110 inserts the unique identifier of the uploaded blocks into blocks index 112 of metadata database 111 of CSS 110 even in case the file upload was interrupted before all the specified blocks were uploaded. In other words, each execution of step 650 causes the unique identifier of at least one uploaded block into blocks index 112 of metadata database 111 of CSS 110. As a result, if the upload is prematurely terminated, i.e., terminated before all of the specified blocks are uploaded, blocks index 112 still contains entries for the blocks that were uploaded, so on the next attempt to upload the file such blocks will be detected as already existing in object storage system 120 and therefore they will not be included in the list of missing blocks when step 630 is executed.

In practice, instead of reading the blocks from object storage system 120, it is often possible to offload the concatenation operation to object storage system 120 itself, which typically has a dedicated function to assemble a new object from a list of other objects, such as blocks, or fragments of other objects. In one embodiment, the concatenation of step 670 is offloaded, so as to avoid retrieving and storing the blocks over network 130 to cloud storage service 110, with aim of removing object storage system 120 from the data path and reducing network round trips and bandwidth. This may be achieved by offloading the concatenation to object storage system 120, by using, for example, a multipart upload request which designates the objects in blocks bucket 121 as the copy source. This may be achieved using some object storage systems, such as Amazon Web Services (AWS) S3, which make it possible to upload objects by copying data from existing objects. In AWS SE this is called "UploadPartCopy" and documentation describing it is publicly available. Other object storage vendors also support similar capabilities.

In another embodiment, the concatenation and writing of step 670 is offloaded to a concatenation service (not shown) that is separate from cloud storage service 110 and the object storage system 120. The concatenation service should preferably be located near object storage system 120 so as to minimize network transport for reads and writes. This is useful in situations where an implementation of object storage system 120 does not support the aforementioned multipart upload request Object storage systems typically do not support Portable Operating System Interface (POSIX) filesystem semantics and particularly, such object storage systems do not have an atomic object rename operation. By atomic it is meant, as is well known in computer science, that the operation succeeds or fails completely and there are no "in between" states where the operation was partially performed. Therefore, in the files layout, implementing the rename operation cannot be done with a single operation. Rather, to rename a file stored as an object in an object storage system in the file layout, cloud storage service 110 copies the object representing the file in the files bucket with the old filename to the new filename, deletes the object with the old filename, and updates the files index. To rename a folder, cloud storage service 110 iterates over all the objects with a prefix equal to the directory path and performs the rename operation for each of them.

It should be appreciated that the above process is not atomic, therefore if the process is aborted before completion due to any reason, the files bucket will contain both the new and the old objects. To ensure atomicity of the rename operation transaction management techniques may be used. In one embodiment, a transaction journal is used to be able to recover from a partially completed rename operation. The transaction journal can be implemented using a queuing system, message bus, a log file and such. In another embodiment, temporary objects are written to object storage system 120, indicating the intent to perform a rename operation.

It should be noted in the above discussion regarding renaming a file, certain steps are mentioned in terms of being executed sequentially. However, this is for sake of simplicity of description and one or more of the steps or portions thereof may be executed concurrently with one or more others of the steps or portions thereof to provide higher efficiency and improved performance in view of network and storage latencies. Furthermore, as will be appreciated by those of ordinary skill in the art, the order of execution of the steps may vary from the specifics described above. In addition, for object storage systems which support batch operations, the rename process for directories can benefit from being performed as a batch operation job.

In some object storage systems, the maximum object size may be large, for example, 5 terabytes, but the maximum object size in a single upload request may be limited to a smaller size, for example to 5 gigabytes. It is possible to upload larger objects using a multipart upload request to assemble the larger objects from multiple smaller parts. It should be appreciated that since multipart upload request is utilized in step 650, the maximum size of a file is not limited to the size of a single upload request.

In some embodiments, blocks cleaner unit 114 operates in the background to delete blocks from blocks bucket 121. This may be done to reduce the storage space consumption of blocks bucket 121. In an embodiment, blocks cleaner unit 114 selects each block to delete based on an estimated likelihood that the block will be needed again for a future upload process. Blocks which are more likely to be useful for a future upload, e.g., where the estimated likelihood is above a specified threshold, will be kept while blocks which are unlikely to be used again, e.g., where the estimated likelihood is below a specified threshold, will be deleted from the blocks bucket.

For example, the system can maintain statistics about the frequency of use for each block object in the blocks bucket, and objects that are used more frequently will not be removed as it may be assumed that they are likely to be helpful to accelerate future uploads. In this regard a reference count for each block that indicates how many files refer to this block may be maintained, and the assumption made that the higher the reference count of a block, the more likely it is that the block will be referred again in future uploads.

Note that deleting the block from blocks bucket 121 does not actually lose any information since the purpose of blocks bucket 121 is to accelerate uploads, and as such it only acts as a temporary place to store blocks for files that are being uploaded. Once a file has been fully uploaded, it has its blocks concatenated and it is stored in files bucket 122. So the remaining objects in blocks bucket 121 can be removed whenever desired without loss of any data.

Thus, it should be appreciated that in these embodiments, blocks bucket 121 does not store a copy of all blocks in the system but rather operates as a cache of blocks to speed up future file uploads and reduce bandwidth requirements for uploading modified or copied files. Long term the blocks are stored concatenated in the files bucket given that, as described above, for each file all the blocks it consists of are copied into the file's object stored in files bucket 122. Once the copying is completed, there is no longer any need for the blocks to be in blocks bucket 121 other than for us in accelerating future uploads. As such, any of the many known cache replacement policies may be used as the underlying cache algorithm of the blocks cleaner unit, such as least recently used (LRU), segmented LRU (SLRU), least frequently used (LFU) and so on.

In an embodiment, blocks index 113 is a key/value store where the key is the block unique identifier and the value corresponding to the key is one or more resource locators that indicate the location of the block, the location being a block object in blocks bucket 121, or a byte range within an object in the files bucket 122. A block may have more than one location. For example, a block may be located in blocks bucket 121 simply as a block but the block may also be found in files bucket 122 as a portion of a file object.

As an example, for the above embodiment in which blocks index 113 is a key/value store, blocks index 113 may store the key "4309582039422a1f" indicating a unique identifier of some blocks, and the following two resource locators, implemented as uniform resource locators (URL):

1. https://my.objectstore.example/blocks/4309582039422a1f
2. https://my.objectstore.example/files/a.txt?byterange=5000, 10000

The first resource locator indicates the location of the block as a block object in blocks bucket 121 and the second resource locator indicates the location of the block as a byte range 5,000-10,000 within a file object, e.g., file "a.txt", in files bucket 122.

Given that in this embodiment blocks may be found in objects that are in both blocks bucket 121 and files bucket 122, steps 620 and 650 in the process of FIG. 6 may utilize not only block objects from the blocks bucket 121 but also blocks that are byte ranges within file objects in files bucket 122. Furthermore, in this embodiment, in step 670, after concatenation is completed, an additional location is added in the blocks index for each block of the file, the additional location indicating the file object and the byte range within the file object where the data of the block can be found.

Figure 7:
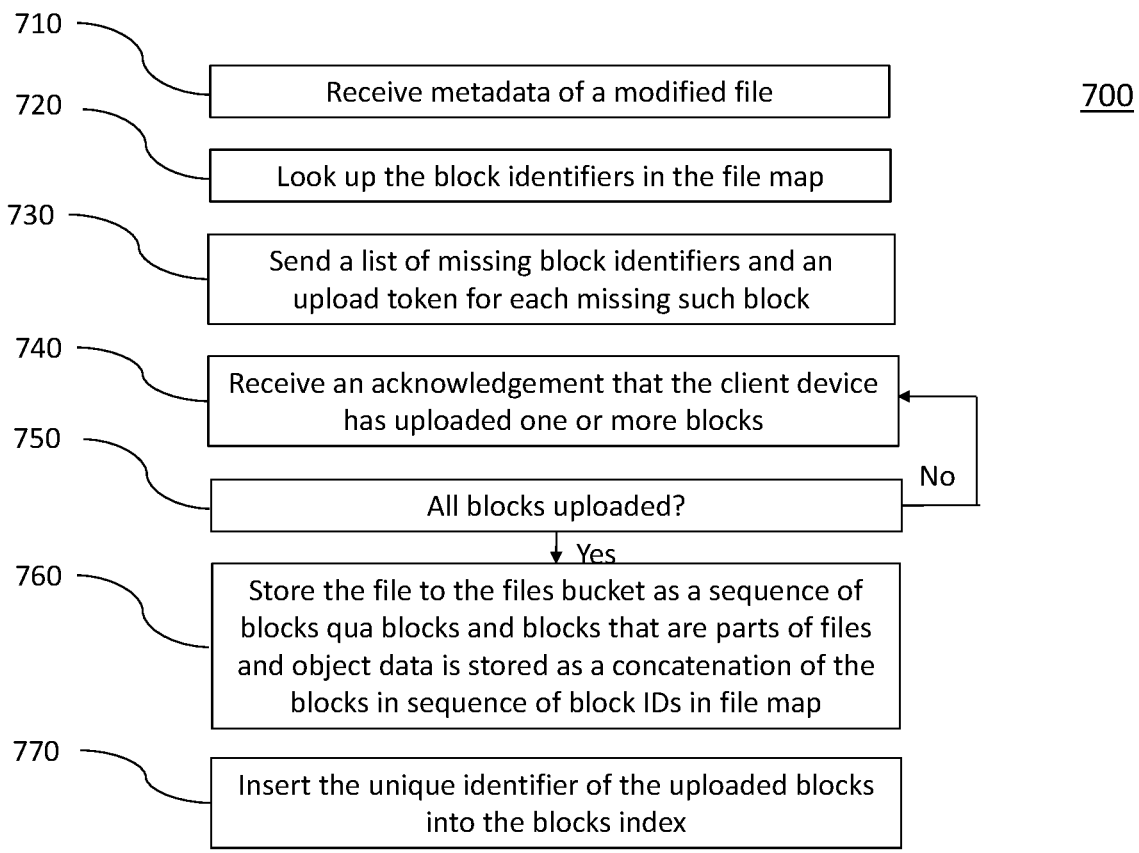
FIG. 7 shows an illustrative flowchart of a process of uploading a modified file from a client device to an object storage system with orchestration by a cloud storage service as seen from the perspective of the cloud storage service.

FIG. 7 shows an illustrative flowchart 700 of the process of uploading a modified file from client device 100 to object storage system 120 with orchestration by the CSS 110 as seen from the perspective of CSS 110.

The process is entered in step 710 in which cloud storage service 110 receives the metadata of a modified file from client device 100, the metadata including a file map a, file name, a file path, and file attributes. The file map includes block identifiers for blocks that make up the file, or in some embodiments, the portion of the file that has been modified. Next, in step 720, cloud storage service 110 looks up in the blocks index 112 each of the block identifiers listed the file map to determine a list of unique block identifiers that were listed in the file map but are not stored in the blocks index 112. Thereafter, in step 730, cloud storage service 110 sends to client device 100 a list of unique block identifiers which were determined to have been listed in the file map but were not found to exist in blocks index 112. Also, if the list is not empty, for each such missing block an upload token indicating instruction for uploading the block to blocks bucket 121.

Cloud storage service 110 receives an acknowledgement that client device 100 has uploaded one or more of the blocks in step 740. This acknowledgment may, in one embodiment, come from client device 100 itself. In other embodiments it may be generated using other methods such as are described hereinabove with regards to FIG. 5.

Next, conditional branch point 750 tests to determine if all the blocks specified by the list of missing block identifiers have been uploaded. If the test result in step 750 is NO, indicating that there yet remains at least one more block specified on the list of missing block identifiers to upload, control passes back to step 740. If the test result in step 750 is YES, indicating that there remain no more blocks to upload, control passes to step 760.

During step 760, cloud storage service 110 stores the file to files bucket 122 of object storage system 120 as a file object with a unique identifier based on the file name and path with the object's data being stored as a concatenation of the blocks from the blocks bucket 121 and blocks defined as byte ranges within file objects in files bucket 122. These blocks in total are the ones that correspond to and are specified by the sequence of block identifiers in the file map and the resource locators of the blocks are stored in blocks index 112.

In step 770, cloud storage service 110 registers in blocks index 112 a resource locator for at least one block, where the resource locator indicates the location of the block in at least one of files bucket 122 or blocks bucket 121.

In an embodiment, multipart upload command is implemented such as by using the S3 API "UploadPartCopy", specifying the data source by adding the request header x-amz-copy-source and a byte range by adding the request header x-amz-copy-source-range.

It should be noted that steps in the above flowchart is shown as executed sequentially for sake of simplicity. However, one or more of the steps or portions thereof may be executed concurrently with one or more others of the steps or portions thereof to provide higher efficiency and improved performance in view of network and storage latencies. Furthermore, as will be appreciated by those of ordinary skill in the art, the order of execution of the steps in the above process may vary from the specifics shown above.

Advantageously, the above process further optimizes uploading of modified files by utilizing a copy of those blocks that exists as a byte range in files bucket 122 in case they were already deleted from blocks bucket 121 by block cleaner unit 114.

The objects in blocks bucket 122, by virtue of being stored so as to be addressed by their hash, are typically immutable, i.e., they do not change. However, files bucket 121 contains file objects that may change, which may be, in some cases, deleted or modified. Such changes may alter the content of a particular byte range that is being pointed to as being a block. If such a change occurs during execution of the process of FIG. 7 between step S710 and step S750 a race condition may result. If the file object is modified or deleted while steps 710 to 750 are being executed, the block referred to may not be found in step S750, or the found block may not be up to date. In either case, the result will be an integrity error in the concatenated file. As such, it is essential to detect such cases to avoid a corrupted concatenated file.

In an embodiment, source objects are checked for integrity, i.e., they are checked to make sure that the actual block that is going to be pointed to in the concatenated file is the actual block that should be pointed to. This may be done based on checking the object modification time, object entity tag (etag), content hash, and so on to ensure that what is being pointed to is indeed the original block that is expected.

In one embodiment, if an integrity error occurs, the cloud storage service 110 requests that client 100 provide the version of the missing or changed block as it has the block. Alternatively, in another embodiment, cloud storage service 110 may simply request that client 100 retry the upload. In such a case, assuming that there is no further race condition, the deleted or modified block will be detected as being missing and hence will be placed on the list of missing block identifiers and an upload token supplied for it.

Several techniques may be used to avoid or recover from an integrity error in step S750 by finding the missing block in another location and thereby preventing the need to request the missing block from the client device or to retry the upload.

In a first such technique, cloud storage service 110 may attempt to recover from an integrity error by recovering the necessary block from a trashcan, which is a set aside area of storage that retains file objects deleted from files bucket 122 for at least some period of time or until otherwise overwritten.

In a second such technique, cloud storage service 110 may attempt to recover from integrity errors by relying on a previous versions store, which retains previous versions of modified files from files bucket 122 for at least some period or until otherwise overwritten. In an embodiment, the previous versions store is based on versioning capabilities of object storage system 120.

In a third such technique, cloud storage service 122 may attempt to avoid integrity errors altogether, by copying byte ranges found in step S720 that are potentially changeable or deletable to a non-mutable storage area which is marked to be retained for at least a period of time. To avoid the cost of copying in step S720, a copy-on-write technique can be used. Such a technique copies the file to the non-mutable storage area only when the file is being modified or deleted. In one embodiment, if potentially changeable or deletable blocks were found in step S720, they are copied back to non-changeable block objects in the blocks bucket, and the blocks index is updated to indicate the existence of a non-mutable copy.

In some cases, it may be desired to migrate a global filesystem from a blocks layout to a files layout. Furthermore, it may be desired to perform the migration from blocks to files layout while the cloud storage system is online. To do so, initially, files bucket 122 is presumed empty with regard to the filesystem to be migrated under the notion that the global filesystem was only implemented in a blocks layout. In addition, with regard to this global filesystem blocks cleaner unit 114 is disabled.

The cloud storage service 110 performs the following in an iterative fashion over the files index. For each file in the files index, cloud storage service 110 reconstructs the file using blocks from blocks bucket 121 by concatenating the blocks of the file into a single file object and storing that file object in files bucket 122. When the process ends, blocks cleaner unit 114 can be enabled, to reduce the size of blocks bucket 121. In this regard, blocks that were used only for the files that were reconstructed into file form and stored in files bucket 122 may be removed.

In an embodiment, in the manner described above, the concatenation process is offloaded to object storage system 120 using a multipart COPY request, thus avoiding the need to have the blocks transmitted from blocks bucket 121 of object storage system 120 over network 130 to cloud storage service 110 and then back to object storage system 120 to be stored in files bucket 122.

It should be noted that the process described above is explained as being executed sequentially for sake of simplicity. However, one or more of the steps or portions thereof may be executed concurrently with one or more others of the steps or portions thereof to provide higher efficiency and improved performance in view of network and storage latencies.

In an embodiment, an access interception unit (not shown) intercepts access requests to files bucket 122 during the migration process. If the request is for accessing a file that was not yet migrated to the files bucket, rather than returning an error, the file is concatenated from its constituent blocks on the fly by the access interception unit and the result is returned in response to the request. In an embodiment, the interception unit is implemented by serverless functions, such as AWS Lambda AWS S3 object lambda or the like.

In an embodiment, infrastructure arrangement 10 may use a combination of blocks layout and file layout, with some files or folders being stored in a blocks layout and others stored in a files layout.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality.

Thus, for example, it will be appreciated by those skilled in the art that any block diagrams herein represent conceptual views of illustrative circuitry or components embodying the principles of the invention. Similarly, it will be appreciated that any flow charts, flow diagrams, state transition diagrams, pseudocode, process descriptions and the like represent various processes which may be substantially represented in computer readable medium and so executed by a computer or processor, whether or not such computer or processor is explicitly shown.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. A processor may have one or more so-called "processing cores". Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), graphics processing unit (GPU), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for storing a file in cloud storage service (CSS) having a blocks index for indexing blocks that each have a unique block identifier, each block identifier being based on the content of the respective one of the blocks that it identifies, the blocks index having entries indicating for each block identifier at least one location of the block within an object storage system (OSS), comprising:

transmitting, from the CSS, a list of at least one block identifier indicating at least one respective block that is not in the blocks index but which is indicated by a received file map for the file, each block on the list having a unique block identifier;

adding, by the CSS, for each respective block indicated on the list and that has been successfully uploaded to the OSS, an entry into the blocks index to indicate a location of the uploaded block within the OSS; and when all of the blocks indicated on the list have been successfully uploaded, concatenating all of the blocks of the received file map in an order specified by the received file map to form a file object corresponding to the file in the OSS;

wherein the transmitted list further includes at least one upload token, wherein the at least one upload token specifies information for a client device to successfully upload to the OSS one or more of the blocks that the upload token is for.

2. The method of claim 1, at least one of the at least one successfully uploaded block is retained in the OSS and its respective corresponding entry is retained in the blocks index until being deleted by a blocks cleaner unit.

3. The method of claim 1, wherein each respective block that has been successfully uploaded to the OSS is stored in a first bucket of the OSS and the file object is stored in a second bucket of the OSS.

4. The method of claim 1, wherein the concatenation is performed by at least one or more of the: the CSS, the OSS, and a concatenation service.

5. The method of claim 1, wherein the file object is stored with a unique identifier based on a name of the file and a path of the file.

6. The method of claim 1, further comprising:
adding, for at least one unique block indicated by the received file map, an additional entry to the blocks index, the additional entry being at least a location in the OSS of the file object.

7. The method of claim 6, wherein the additional entry further specifies a byte range within the file object.

8. The method of claim 6, further comprising:
when a block identifier for a block indicated by the received file map corresponds to at least one entry in the blocks index that is a location in the OSS of a file object, calculating a block identifier for the indicated block based on the content of the file object indicated by the location;
when the block identifier calculated based on the content of the file object indicated by the location does not match the block identifier indicated by the received file map, indicating the occurrence of an integrity error; and
recovering from the integrity error.

9. The method of claim 8, wherein recovering from the integrity error comprises finding in the OSS an additional location of the block indicated by the received file map for which a block identifier that is calculated based on the content indicated by the additional location matches the block identifier indicated by the received file map, wherein the additional location is one of: a deleted files trashcan, a previous file versions store, and a location indicated by an additional entry in the blocks index.

10. The method of claim 1, further comprising:
adding, for at least one unique block indicated by the received file map, an additional entry to the blocks index, the additional entry being at least a location of a container object containing at least the at least one unique block indicated by the received file map and a different other at least one unique block indicated by the received file map.

11. A non-transitory computer readable medium having stored thereon instructions for causing a processing circuitry to execute a process for storing a file in a cloud storage service (CSS) having a blocks index for indexing blocks that each have a unique block identifier, each block identifier being based on the content of the respective one of the blocks that it identifies, the blocks index having entries indicating for each block identifier at least one location of the block within an object storage system (OSS), the process comprising:
transmitting, from the CSS, a list of at least one block identifier indicating at least one respective block that is not in the blocks index but which is indicated by a received file map for the file, each block on the list having a unique block identifier;
adding, by the CSS, for each respective block indicated on the list and that has been successfully uploaded to the OSS, an entry into the blocks index to indicate a location of the uploaded block within the OSS; and
when all of the blocks indicated on the list have been successfully uploaded, concatenating all of the blocks of the received file map in an order specified by the received file map to form a file object corresponding to the file in the OSS;
wherein the transmitted list further includes at least one upload token, wherein the at least one upload token specifies information for a client device to successfully upload to the OSS one or more of the blocks that the upload token is for.

12. A system for storing a file in cloud storage service (CSS) having a blocks index for indexing blocks that each have a unique block identifier, each block identifier being based on the content of the respective one of the blocks that it identifies, the blocks index having entries indicating for each block identifier at least one location of the block within an object storage system (OSS), comprising:
a processing circuitry; and
a memory, the memory containing instructions that, when executed by the processing circuitry, configure the system to:
transmit, from the CSS, a list of at least one block identifier indicating at least one respective block that is not in the blocks index but which is indicated by a received file map for the file, each block on the list having a unique block identifier;
add, by the CSS, for each respective block indicated on the list and that has been successfully uploaded to the OSS, an entry into the blocks index to indicate a location of the uploaded block within the OSS; and
when all of the blocks indicated on the list have been successfully uploaded, concatenate all of the blocks of the received file map in an order specified by the received file map to form a file object corresponding to the file in the OSS;
wherein the transmitted list further includes at least one upload token, wherein the at least one upload token specifies information for a client device to successfully upload to the OSS one or more of the blocks that the upload token is for.

13. The system of claim 12, wherein at least one of the at least one successfully uploaded block is retained in the OSS and its respective corresponding entry is retained in the blocks index until being deleted by a blocks cleaner unit.

14. The system of claim 12, wherein the system is further configured to:
add, for at least one unique block indicated by the received file map, an additional entry to the blocks index, the additional entry being at least a location in the OSS of the file object.

15. The system of claim 14, wherein the additional entry further specifies a byte range within the file object.

16. The system of claim 14, wherein the system is further configured to:
when a block identifier for a block indicated by the received file map corresponds to at least one entry in the blocks index that is a location in the OSS of a file object, calculate a block identifier for the indicated block based on the content of the file object indicated by the location;
when the block identifier calculated based on the content of the file object indicated by the location does not match the block identifier indicated by the received file map, indicate the occurrence of an integrity error; and
recover from the integrity error.

17. The system of claim 16, wherein, to recover from the integrity error, wherein the system is further configured to:
finding in the OSS an additional location of the block indicated by the received file map for which a block identifier that is calculated based on the content indicated by the additional location matches the block identifier indicated by the received file map, wherein the additional location is one of: a deleted files trashcan, a previous file versions store, and a location indicated by an additional entry in the blocks index.

18. The system of claim 12, wherein the system is further configured to:
   add, for at least one unique block indicated by the received file map, an additional entry to the blocks index, the additional entry being at least a location of a container object containing at least the at least one unique block indicated by the received file map and a different other at least one unique block indicated by the received file map.

\* \* \* \* \*